United States Patent [19]

Restrepo

[11] 4,407,676
[45] Oct. 4, 1983

[54] FIBER-REINFORCED CEMENT AND PROCESS

[76] Inventor: José M. Restrepo, Calle 85 No. 14-70, of. 301, Bagotá, Colombia

[21] Appl. No.: 394,785

[22] Filed: Jul. 2, 1982

Related U.S. Application Data

[63] Continuation-in-part of Ser. No. 325,035, Nov. 25, 1981.

[51] Int. Cl.³ .............................................. C04B 21/00
[52] U.S. Cl. ........................................ 106/88; 106/90; 106/99
[58] Field of Search ............................ 106/88, 90, 99

[56] References Cited

U.S. PATENT DOCUMENTS 4,040,855  8/1977  Rady-Pentek et al. ............... 106/90
4,261,754  4/1981  Krenchel et al. ..................... 106/99

*Primary Examiner*—James Poer
*Attorney, Agent, or Firm*—Browdy & Neimark

[57] ABSTRACT

A lightweight hydraulic cement mortar comprising uniformly dispersed reinforcing fibrillated plastic filaments having microfibrillated structure and elements manufactured therefrom having improved mechanical isotropic properties, such as enhanced performance regarding their semi-elastic limit and impact loading characteristics and also a specific weight less than two is disclosed; it is disclosed also the process for manufacturing said elements.

20 Claims, No Drawings

FIBER-REINFORCED CEMENT AND PROCESS

CROSS-REFERENCE TO RELATED APPLICATION

The present application is a continuation-in-part of copending application Ser. No. 325,035, filed Nov. 25, 1981, the entire contents of which are hereby incorporated by reference.

BACKGROUND OF THE INVENTION

Heretofore, it has been proposed to use polymeric plastic material to enhance in that way the general behavior of cement-based parts, by incorporating such materials into the cement mix by means of varied techniques. According to one approach, for example, liquid polymeric-resin systems have been formulated to be embodied into mortars and concretes, developing thereby in their end products improved tensile strength and compressive strength, as well as characteristics of chemical and abrassion-resistance. Thus, a polymer mortar is prepared by partially replacing cement with polymer in the respective cementitious mix. This process requires to use on the one hand, specific liquid polymer systems (resins, accelerators and catalysts) and, on the other, apparatus specially designed for proportioning and blending the appropriate amounts of materials. To the effect, the plastic industry has devised suitable polymer systems comprising resin as their main constituent, where the particular resin has often been selected from polyester and methyl or polymethylmethacrylate resins, together with promoters and frequently other proprietary additives. As a result, cement-mix processors depend on the use of hardly available materials. Moreover, another limitation discouraging the widespread use of the polymer resin-cement techniques is brought about by the need to use sophisticated and expensive proportioning and blending machines.

Also, in the always continuing efforts to enhance properties of parts manufactured from cement mixtures, particularly to increase the strength of cement-based building elements subjected to impact loading, the use of plastic filamentary reinforcing means has been proposed. Plastic fibers, however, have proved to be unsuitable in some respects as reinforcing materials. A main drawback is the one arising in great measure from the plastic fibers' hydrophobic nature, which comes to impair their frictional adhesion with the cementitious matrix whereby the stressed plastic filaments become debonded. The problem brought about by the poor physic-chemical adherence with their matrix is also involved to deter further the use of the so far commercially available plastic fiber as reinforcing means for cement products. In order to overcome such a hidrance posed to the use of monofilamentary plastic fibers it has been proposed to use certain plastic materials in the form of fibrillated films, as a reinforcing means for cement-based elements. The foregoing approach permitted indeed attainment of good mechanical bonding of the reinforcing fibrillated films with the cement matrix.

Typical of the foregoing technique of manufacturing cement-based parts reinforced with plastic fibers is the U.K. Pat. No. 1 582 945 issued on Jan. 21, 1981, to the University of Surrey and D. J. Hannant. The patent teaches, for reinforcing purposes, to use fibrillated polypropylene film, left as a structure comprised of spread-out, non-woven elongated fibers forming a film-like mesh, or used as a woven-mesh structure. In either case, the films are given an open, continuous structure having its dimensions and shape such as to closely fit the dimensions of the sheet-like, plastic-reinforced articles. The plastic reinforced sheets manufactured by the method of the patent are necessarily layered structures, having the fibers as a single-direction reinforcement, as a direct consequence of their manufacturing process. The sheets have been proposed as suitable substitutes for asbestos-reinforced cement articles. However, certain conditions, particularly under high temperature, bring about spallation and delamination of the aforecited layered structures.

The U.K. Pat. No. 1 586 512 issued on Mar. 18, 1981, to Dansk Eternit-Fabrik, Denmark, deals with the manufacturing of building of sheets wherein the cement is reinforced by means of polypropylene fibers; the cementitious mix is reinforced further with mineral flakes and other fibers; and the fibers are concentrated in layers in the sheets.

According to the technologies based on the use of fibrillated plastic films as the reinforcing means for cement-based parts, they are coated with cement mortar and the excess mortar removed from the coated films; the so coated layers are laid in sequence each coextensively arranged into the other until piling up the required number of layers to make up the desired sheet thickness. The so prepared sheet while still in its fresh condition may be handled to be molded into the shape of the particular mold used, suited to the end product. The articles manufactured in that way, because of prevailing orientation of the fibrils in their reinforcing films in one direction only, have values for its mechanical properties greatly differing according to the directions in which they are oriented; that is, the articles are said to be remarkably anisotropic. The anisotropic nature is controlled then, in accordance to the orientation in which the plastic mesh is placed and according as the mesh opening.

As stated above, in accordance with the foregoing process the reinforcing plastic films are mechanically slit into a predetermined degree of fibrillation which will be preserved throughout the manufacturing process and it will be the same amount of fibrillation that will be present in the hardened cement product. Since the fibrillated film is embedded into a previously prepared mortar paste, and inasmuch as the plastic material is chosen from polyolefines, particularly polypropylene, which are hardly wettable materials, the process therefore does not provide for means to help promote the desirable humidification to develop appropriate adherence between the fibrous material and the matrix encapsulating it. Poor adhesion impairs the tensile strength of the cement mortar elements obtained by this process, as well as its ability to develop closely spaced multicracking with desirable small cracks. The development of thin cracks in a closely arranged pattern is a phenomenon normally occuring in hardened cement elements which have been reinforced by means of aligned polypropylene fibers.

Summarizing, there are prior art processes designed for replacing asbestos fibers with polypropylene fibers as a reinforcing material for cement-based elements, particularly reinforced cement sheets, boards and the like, and the literature abounds in reference to such techniques. Even though satisfactory plastic fibers-reinforced cement showing properties bearing comparison with those of asbestos-reinforced cements have been obtained through prior art processes, their use is restrained first, because they in any event originate a material suitable only for sheet products; the reinforcing material is not efficiently used thereby; the fiber-cement material is suited to be shaped by one definite molding operation only; and also because the end products obtained therefrom are remarkably anisotropic in nature.

In order to obtain a lightweight concrete mortar, prior art has used inert fillers of organic origin, or expanded polystyrene ("Styropor", BASF Germany), in which case, because there are no fibers present, use must be made of humidifiers for the spheres, such as: (a) Acronal DS 3003, or Propiafan 325 D from BASF, England; and (b) Teepol (Shell) or its equivalent, Comprox 3223 (B.P.). As an humidifier, there has been used in Canada an acrylic: Acronal 2900 product of Malavic, Inc. (Quebec) manufacturer of blocks "Sparfil".

Another well-known means of obtaining lightweight concrete is by introducing gas bubbles into the plastic cement mix in order to produce a material with a cellular structure, somewhat similar to sponge rubber. For this reason the resulting concrete is known as cellular or aerated concrete. There are two basic methods of producing aeration, an appropriate name being given to each end product.

Gas concrete is obtained by a chemical reaction generating a gas in fresh mortar, so that when it sets it contains a large number of gas bubbles. Finely divided aluminium powder is most commonly used, its proportion being of the order of 0.2 percent of the weight of cement. The reaction of the active powder with a hydroxide of calcium or alkali liberates hydrogen, which forms the bubbles. Powdered zinc can also be used. Sometimes hydrogen peroxide is used; this generates oxygen.

Foamed concrete is produced by adding to the mix a foaming agent (usually some form of hydrolyzed protein or resin soap) which introduces and stabilizes air bubbles during mixing at high speed. In some processes a stable pre-formed foam is added to the mortar during mixing in an ordinary mixer.

Cellular concrete is mostly used for partitions for heat insulation purposes because of its low thermal conductivity, and for fireproofing as it offers better fire resistance than ordinary concrete.

Portland cement with aerating agent, is that which contains some substance which incorporates many very small gas bubbles to the concrete made with such cement. Before setting, this concrete has more plasticity and is more homogeneous than common concrete, because the bubbles delay sedimentation of greater particles. The first Portland cement with aerating agent was manufactured in the United States in 1938, and in 1942 the American Society of Testing Materials (ASTM) adopted a specification for it.

Manufacture of Portland cement with aerating agent is similar to that of common Portland cement, except that the aerating agent is ground with the clinker in the final grinding operation. Generally, the quantity of aerating agent is 0.01-0.02% in weight of cement, and the quantity which must be added for a particular cement is fixed by the required quantity for obtaining an air content of 19±3% in a normal mortar, as described in the ASTM method to determine the air content of hydraulic cement mortar.

As aerating agent, several materials may be used. The ASTM specifies the following: (1) natural woods' resins, such as that from silver tree; (2) animal or vegetal greases and resins, such as fish oil, or tallow, and their fat acids; (3) various humectant agents, such as alkaline salts of sulphonated organic compounds; (4) water-soluble soaps; (5) others, such as hydrogen peroxide and aluminum powder.

Aerated concrete may be made adding these materials directly to the mixer.

SUMMARY OF THE INVENTION

Accordingly, the present invention relates to the preparation of lightweight cement mortar materials comprising reinforcing plastic fibers and chunks of a cellular plastic (crushed in the mixing process, or before it, and/or gas bubbles, wherein the above set forth drawbacks are overcome.

Consequently, a main object of this invention is to provide products from plastic-fibers reinforced mortar wherein the effect of mechanical anchoring of the fiber into the cementitious matrix is improved and, thus, more efficient use of the reinforcing material is achieved, whereby the end products are obtained in a less expensive manner, providing at the same time gas bubbles (or chunks of a cellular plastic) which cause the mortar to be lightweight.

Another object of the present invention is to provide a lightweight fiber-cement material which is reinforced by means of individual, refibrillated plastic fibers, made from fibrillated untwisted ribbons. Said material is very well suited to be molded into variously-shaped products by means of a wide variety of molding processes.

Still, an additional object of this invention is to provide lightweight fiber-cement products possessing identical mechanical properties when measured to any directions thereto and, accordingly, the end elements are as wholly isotropic as possible.

Yet another object of the invention is to provide lightweight plastic fiber-reinforced products having increased resistance to withstand tensile loads and impact loading after the hardened cementitious matrix has developed minute cracking therein, compared with the respective properties of the same cement matrix free from said reinforcing material.

The invention provides for a fibrous cement material comprised of a hydraulically setting binder as typified by Portland cement mortar, and randomly oriented separate plastic fibers uniformly dispersed therein, so as to bring the end-product anisotropy down to a minimum, and wherein said plastic fibers are given a microfibrillated structure, as it will be set forth hereinbelow.

In accordance with the invention, development of bond or true adherences between plastic fibers and the cement matrix is brought about only by actual mechanical interlocking between branched out end "hooked" fibrils outwardly extended from the separate plastic fibers, and the mortar matrix; so that said fibers are capable to transmit tension forces between spaced-apart adjacent blocks of the fissured matrix. The spacing between fracturing cracks in the matrix as well as the crack width can be controlled as a result of taking into consideration several fiber features regarding for instance, their shape, length, diameter, orientation and their amount incorporated into the cement mass, as well as the degree of fibrillation given thereto.

The fiber present within the matrix, according to this invention, is a branched monofilament fiber derived from an untwisted fibrillated ribbon of fibrillate polyolefin film. The polyolefin film is cut into rather long narrow ribbons or strips of about 15 mm wide, and the non-twisted ribbons are fibrillated into fibers by conventional fibrillating means. The so fibrillated ribbons are cut into lengths going up to about 50 mm long. These sections of fibrillated ribbons are first air treated to spread out their separate fibers and then they are fed into a mortar mixing machine fitted with a highspeed propeller, wherein the mortar components, fibrous material and chunks of a cellular plastic and/or aerating agent are blended together. The mechanical shredding action which takes place in the mixing operation causes the ribbon fibrils to become further fibrillated or refibrillated and the ribbon fibrils are broken apart into individual filaments having a branched structure provided with microfibrils or fibrets outwardly projecting along their length. The projected microfibrils are somewhat curled in shape, and for their anchorage purposes they perform as anchoring elements or "hooks" within the cement hardened matrix. The filaments cross-sectional area and their length as well as their length in one same direction—differ from one another. The chunks do not need a humidifier because the structural cohesion of the mix relies on the action of the fiber and not on the binding of the cellular plastic chunks with the matrix. If aerated concrete is desired, the foaming agent is added, and the high speed mixing generates the air bubbles from the foaming agent. Otherwise an aerating agent is added to incorporate the air bubbles. The chunks of cellular plastic are selected from expanded polystyrene, expanded polyurethane, both of which are crushed before the mixing, or any other expanded plastic.

The multiple cracking which has normally been shown to occur in cement-mortar hardened elements gives rise to lengthening of the fibers, in that way bringing stresses to bear along the longitudinal fibers which are directed to pull the fibers out from their condition embedded within the cement matrix. Longitudinal mineral reinforcing fibers and generally the fibers deprived of branched structure are liable to such pull-out failure, and actually fail. In contraposition, the side branches or "hooks" extended from the microfibrillated fibers according to the present invention, act to resist fiber dislodging from within the matrix.

DESCRIPTION OF THE INVENTION

The hereinabove stated objectives and advantages are achieved to the invention by providing a composite material comprising an intimate and homogeneous mixture of microfibrillated polyolefin filaments which are oriented in all of the spatial directions and kept evenly distributed throughout the mass of hydraulically setting binder, like Portland cement. Because of both the polydirectional orientation of the fibers in the mass, and their particularly fibrillated structure suitable to achieve a hook-like anchoranging reinforcement, the so reinforced composite material gives rise to elements having identical mechanical properties when measured at any directions thereof, that is, they physically behave as isotropic bodies. Of course, mechanical isotropy is a largely desirable behavior in elements.

The invention takes into consideration the observation that fabrillated sections cut from polyolefin ribbons, when subjected to the combined effect of a shear mixer and shredding action of the mortar components, basically cement and sand besides breaking apart into monofilamentary fibers, these monofilaments become microfibrillated branched structures with laterally extending microfibrils or fibrets having varying length and cross-sectional area. Also, the microfibrillated polyolefin fibers are thoroughly wetted in the mortar components' mixing operation. It should be noted at this point, however, that the true adherence of the plastic micro-fibrillated fibers with the cement matrix does not depend in the present process on a physicochemical phenomenon inasmuch as polyolefins and cement do not show chemical affinity to each other. Nor can the good fiber-to-matrix bonding actually achieved either be considered as being merely derived from frictional action, because the polyolefins' lateral to longitudinal deformation ratio, or Poisson's ratio, is very high. As a result of such a high deformation ratio, a substantial contraction in the fiber cross-sectional area is due to take place when subjected to a lengthwise applied tensile stress and the fiber would become debonded and dislodged as soon as such a tensile stress is brought into action. On the fact that while the randomly oriented reinforcing filaments are kept from being pulled out from their embedded condition within the matrix and since they at the same time are able to undergo stretching therewithin, lies an essential feature of the invention. Because the present process provides elastic behavior of the reinforcing filaments to take place, while at the same time allowing that the elongation brought about thereon by the crack opening will not be taken up only by the filament extension spanning or bridging the crack width, but instead of that, the elongation stress is brought to bear throughout the filament length, it follows therefore that the tensile stress is kept thereby below the ultimate elongation of the reinforcing filaments; if the tensile stress were to be concentrated upon the filament section intersecting or spanning the crack width, filament breaking would occur. On the contrary, the fibrillated reinforcing material according to the present invention makes it possible for the tensile stress to be transmitted between adjacent blocks of the fractured matrix through the entire filament stretchable sections while they are kept anchored within the cracked matrix, and this without being substantially affected by the matrix cracks. The adherence is not bonding to the matrix, it is interlocking of the fibrils of the monofilaments and the matrix.

According to the process of the present invention the mortar components comprised of hydraulic cement, water inorganic fillers such as sand which may or may not be used having a particle size distribution such that no particle is greater than 1/10 the average length of the reinforced fibrillated filaments to be formed in the mixing operation, chunks of a cellular plastic, and/or foaming or aerating agent are blended together in a mixer machine equipped with a high-speed propeller. The final specific weight, with the gas bubbles chunks of cellular plastic, is comprised within approximately 0.35 and 1.95. The chunks of cellular plastic are selected from expanded polystyrene, expanded polyurethane, or any other expanded plastic.

As stated hereinabove, the fibrous material fed into the mixing step is derived from polyolefin film which has been slit into ribbons of about 15 mm wide; the ribbons while kept untwisted are fibrillated into fibrils by conventional mechanical means and then cut into sections of about 50 mm long; and thereafter the ribbon fibrillated sections are spread out by air jet means.

As a consequence of the vigorous mechanical stirring carried out in the mixing operation, in combination with the shredding effect that takes place between the plastic fibers and the abrasive particles in the cement mortar, the fibrillating action goes on still further. As a result, besides breaking the plastic ribbon apart into separate monofilaments, secondary branched microfibrils or fibrets are brought forth as ramifications at points along the sides of the monofilament's length. The so formed ramifications or lateral "hooks" account for the high adhesion degree achieved between the fibrous reinforcing material and the cementation matrix. Furthermore, inasmuch as the energetic mechanical stirring helps to improve wetting of the surface of the materials making up the fiber-cement mortar, this in turn causes the mix to enhance its fluidity, improves cement hydration, and the branched fibrils or hooks anchoring power is still improved further.

As a consequence of the plastic fiber's own resilence, its effective length in one direction is a function of its diameter. Also, the amount of fibrillation caused in the plastic ribbons to form separate monofilaments, as well as the mixing time and of course the degree of branching so effect the fiber effective length. Further, the fiber's effective length and its diameter along with the amount of fiber are determining factors of the width and spacing of cracks to be developed in the fiber-cement hardened element once it undergoes its naturally occurring multiple cracking. This hardened element, however already cracked, continues still to effectively withstand tensile stresses.

Performance specifications to be met by a particular fiber-cement element once cracked, will determine the permissible breadth of cracks and spacing therebetween. In the process in accordance with the present invention these characteristics can be controlled since it provides for means to exercise influence over the process parameters related to diameter and length of fiber and of course its amount used.

Both economic considerations and because of its ease of fibrillation, together with the inert chemical nature of polypropylene towards the cement paste, make the polypropylene film the polyolefin preferred for the purpose of the process of the present invention. However, there are neither theoritical nor practical considerations ruling out the use of polyethylene alone instead of polypropylene, nor its admixtures therewith. Other plastic materials films such as acrylonitrile films, can also be used.

The physical properties of the fiber-cement elements reinforced as described above do not decay with time, and, on the contrary, they are increased such as it is the case with articles made from plain cement mortars; and the fibers embedded within the matrix do remain unaffected by natural environmental heat and light.

The material obtained can either be shaped into sheets or it can also be molded into several other forms. Moreover, because of its mechanical isotropic properties this is a multipurpose material that can in an economic manner be used for application such as to replace asbestos-cement as well as for forming flexible coatings, and it is suitable also for varied specific application where high impact loading, elastic behavior and/or lightweight are required characteristics.

For the only purpose of illustrating the invention still further, it is set forth the following specific Example, which by no means is intended to be limitative thereof.

EXAMPLE

Sections of untwisted polypropylene fibrillated ribbon are prepared. The ribbon section is conventionally fibrillated along lengthwise extending slits. In this slit condition the ribbon has the following features:

| | |
|---|---|
| specific weight | 0.91 |
| denier | 6000 |
| width | 15 mm |
| thickness | 50 microns |
| length of section | 47 mm |

From the lack of affinity for water shown by the polypropylene, it could normally be foreseen that the cement elements reinforced by means of such a material would rather have poor mechanical properties. Also, from their low specific weight the polypropylene fibers would be expected to come apart from the cementitious fluid medium or form separate phases therein, thus producing defective end products. These deficiencies suggested from the polyolefin's own nature are surmounted by means of the process of the invention, because the microfibrillated structure that is imparted in the process to the monofilaments, provides the fibrous reinforcing material with increased specific area to be wet by the cementitious medium which in turn makes it easy to form the homogeneous mixture.

12.5 Kg of the so prepared fibrillated ribbon having the aforestated characteristics were subjected to a spreading out step by means of an air stream. Then, the amount (12.5 kg) of slit but untwisted, spread-out ribbon is fed together with 500 kg Type I Portland cement, 300 liters of water, and 5 kg. of aluminum sulphate or 15 kg of expanded polystyrene with an apparent density of 16 g/lt. into a shear mixing machine; while the propeller is kept running the charging operation is carried out little by little for a length of time of at least 6 minutes.

The mixing compartment of the machine is chosen so as to be at least 20% greater than the volume of wet mixture. Said compartment is truncated-cone shaped and it is arranged with its smaller base downwardly directed.

The mixing time was 14 min. with the propeller running at 1200 rpm. In the mixer machine, the fibrillated ribbon undergoes a strong frictional action by the cement particles whereby the ribbon is fully broken apart into separate monofilaments. These monofilaments are at the same time given the further fibrillated structure, by opening them up into a number of microfibrils or generally crimped fibrets varying in cross-sectional area and length.

As hereinabove stated, the adherence of the reinforcing fiber with the reinforced cement matrix is other than a friction pehnomenon, inasmuch as in the polypropylene fiber, and the like plastic fibers, under tensile stress the Poisson's ratio does not allow for contact between the hardened matrix and the reinforcing fiber outer surface. Adherence is therefore the result of anchoring effect.

The specific weight of the fiber-cement as it finally sets is about 0.80; the gas or cellular plastic content is approximately 60% of the total volume.

The distribution of fibers within the matrix, along with the means through which their anchorage to the matrix is achieved, make it sure for the fiber-cement element to resist tension forces after the hardened matrix has become cracked, and that property is equally shown by the element at any directions to its body. The general condition for all of the physical properties of the fiber-cement material prepared according to the present invention lies in its isotropy which is accomplished as a result from the process of its manufacture.

In its fresh condition, the mortar prepared in accordance with the present invention can easily be molded. Its molding may be carried out by means of extrusion, injection molding, casting, centrifugal molding or by means of a combination of the above molding methods. Parts of that material while in their fresh condition are easily joined to each other as a result of the intercrossing of filaments of the different masses to be joined together.

In the foregoing specification the process of the invention permitting to carry into effect the aforecited objectives thereof, has been set out. It should be understood, however, that it is not intended to limit the invention to the details disclosed in this description. It is intended that its equivalents, obvious to the skilled in the art to which the invention pertains, be comprised within the scope of the invention, as it is defined by means of the following claims.

I claim:

1. A cement mortar comprising separate reinforcing filaments obtained from polyolefin film, said separate filaments consisting in sections shredded from non-twisted fibrillated ribbons having a length of up to 50 mm long, with said fibrillated ribbons having been split apart from said polyolefin film, wherein said separate reinforcing filaments have filamentary structure comprising hooked microfibrils outwardly projecting from points along the length of said separate filaments, and wherein separate reinforcing plastic filaments are microfibrillated and evenly distributed throughout the body of said cement mortar in a randomly oriented fashion along all of its special directions by high-speed stirring, and wherein gas bubbles or chunks of a cellular plastic are evenly and randomly distributed throughout said body of cement mortar.

2. A cement mortar comprising reinforcing filaments obtained from a polyolefin film, wherein said filaments are separate sections of fiber having a length of up to about 50 mm long, with said separate filament sections being provided with hooked microfibrils of varying lengths branching out along the length thereof; and wherein said separate filaments are microfibrillated and homogeneously and randomly dispersed by high-speed stirring throughout said cement mortar in randomly directed orientations in all of its spatial directions, and wherein there are gas bubbles or chunks of a cellular plastic which make it lightweight, the gas or cellular plastic volume being from 20% to 80% preferably from 55% to 65% of total volume.

3. Cement mortar as claimed in claim 2, wherein said polyolefin is chosen from the group comprised of polypropylene, polyethylene and mixtures thereof, and wherein said chunks of cellular plastic are selected from the group of expanded polystyrene, expanded polyurethane, other expanded plastics, and mixtures thereof.

4. An isotropic element manufactured from a cement mortar comprising about 0.07% to 5.25% by weight, over total weight, of fibrous reinforcing material comprised of separate microfibrillated filaments evenly distributed throughout the matrix of said element, wherein said filaments are randomly dispersed in all of the spatial directions of said element, with said microfibrillated filaments being separate sections of about 50 mm long shredded from fibrillated polyolefin film, and with said microfibrillated filaments being provided with laterally extending hooked microfibrils of varying lengths branching from points spaced along the length thereof, whereby said element shows substantially equal mechanical properties were measured in any directions of the body thereof; the element has gas bubbles or chunks of a cellular palstic evenly distributed throughout its volume, the gas or cellular plastic volume being between about 20% and 80%, preferably between 55% and 65% of total volume; the specific weight being between 0.35 and 1.95 preferably between 0.50 and 1.50.

5. A cement mortar-based element as claimed in claim 4 wherein said fibrous reinforcing material is selected from the group consisting of polypropylene, polyethylene and mixtures thereof, and wherein said chunks of a cellular plastic are selected from the group consisting of expanded polystyrene, expanded polyurethane, other expanded plastics, and mixtures thereof.

6. A cement mortar-based element as claimed in claim 4 wherein the gas bubbles are produced by an aerating agent selected from aluminum powder, zinc powder, magnesium powder and aluminum sulphate.

7. A cement mortar-based element as claimed in claim 4 wherein the gas bubbles are produced by an aerating agent which is hydrogen peroxide.

8. A cement mortar-based element as claimed in claim 4 wherein the gas bubbles are produced by a foaming agent selected from the alkaline salts of natural woods' resins.

9. A cement mortar-based element as claimed in claim 4 wherein the gas bubbles are produced by a foaming agent selected from the alkaline salts of fatty acids.

10. A cement mortar-based element as claimed in claim 4 wherein the gas bubbles are produced by a foaming agent selected from the alkaline salts of sulphonated organic compounds.

11. A method of manufacturing a cement mortar-based, plastic fiber-reinforced element showing mechanical properties which are independent of the direction of its body in which the properties are measured, which method comprises
   embodying into the cement mortar from about 0.75% by weight to about 5.25% by weight of fibrous reinforcing plastic material comprised of a microfibrillated polyolefin; and from 0.2% to 20%, based on the cement weight, of an aerating agent which generates gas bubbles; or chunks of a cellular plastic instead of the aerating agent;
   mixing the mortar, the fibrous material and aerating-agent or cellular plastic mix or both to form thereby separate microfibrillated filaments of about 50 mm long homogenously dispersed throughout said mix while at the same time said separate filaments are given a microfibrillated structure having laterally extended, hooked microfibrils branching from points spaced along the length thereof; and
   molding the resultant mixture into any element shape with said reinforcing microfibrillated structures being randomly oriented throughout the hardened matrix.

12. A method for manufacturing isotropic elements according to claim 11, wherein said fibrous reinforcing plastic material comprises polypropylene, the aerating agent is aluminum sulphate, and the cellular plastic is expanded polyurethane.

13. A process for producing cement mortar-based elements having mechanical properties substantially equal in all of the directions of their bodies which comprises the steps of;

preparing non-twisted, fibrillated ribbons from a polyolefin film material and cutting the fibrillated ribbons into sections of up to about 50 mm long;

spreading out said fibrillated cut ribbons by air treating the same;

feeding said sections of open-up fibrillated cut ribbon sections into a mixing device provided with high-speed rotary stirring means while at the same time cement, water, an aerating or foaming agent or chunks of a cellular plastic or both are being fed into said mixing device, and stirring the mix for a time enough to bring about, by means of the shredding action between said mix particulate materials and said ribbons, separate microfibrillated filaments having microfibrillated structure provided with hooked microfibrils branching therealong, with said microfibrillated filaments, gas bubbles or chunks of a cellular plastic being homogenously distributed throughout the mass of said cement mortar mix, and in orientations randomly directed along all of its spatial directions; and, molding said cement mortar containing said microfibrillated filaments and said gas bubbles or chunks of a cellular plastic into the shape of said elements.

14. A process according to claim 13, where said polyolefin film is selected from the group consisting of polypropylene, polyethylene, and mixes thereof, and wherein said cellular plastic is selected from the group consisting of expanded polystyrene, expanded polyurethane, other expanded plastics and mixtures thereof.

15. A process according to claim 13, wherein the gas bubbles are produced by an aerating agent selected from aluminium powder, zinc powder, magnesium powder and aluminum sulphate.

16. A process according to claim 13, wherein the gas bubbles are produced by an aerating agent which is hydrogen peroxide.

17. A process according to claim 13, wherein the gas bubbles are produced by a foaming agent selected from the alkaline salts of natural woods' resins.

18. A process according to claim 13, wherein the gas bubbles are produced by a foaming agent selected from the alkaline salts of fatty acids.

19. A process according to claim 13, wherein the gas bubbles are produced by a foaming agent selected from the alkaline salts of sulphonated organic compounds.

20. Cement mortar as claimed in claim 1, wherein said polyolefin is selected from the group consisting of polypropylene, polyethylene and mixtures thereof, and wherein said chunks of cellular plastic are selected from the group consisting of expanded polystyrene, expanded polyurethane, other expanded plastics, and mixtures thereof.

* * * * *